United States Patent [19]

Hilsebein et al.

[11] Patent Number: 4,738,754

[45] Date of Patent: Apr. 19, 1988

[54] METHOD OF RECOVERING AMMONIA FROM AN AQUEOUS EFFLUENT WHICH CONTAINS $NH_3$, $CO_2$ AND $H_2S$

[75] Inventors: Wolfgang Hilsebein, Frankfurt am Main; Gert Ungar, Maintal; Hans M. Stönner, Eschborn, all of Fed. Rep. of Germany

[73] Assignees: Metallgesellschaft Aktiengesellschaft, Frankfurt am Main, Fed. Rep. of Germany; Chemie Linz AG, Linz, Austria

[21] Appl. No.: 867,320

[22] Filed: May 23, 1986

[30] Foreign Application Priority Data

Jun. 12, 1985 [DE] Fed. Rep. of Germany ....... 3520934

[51] Int. Cl.⁴ .............................................. B01D 3/00
[52] U.S. Cl. ........................................ 203/42; 203/75; 203/77; 203/78; 203/80; 203/90; 203/DIG. 9; 55/44; 55/50; 55/70
[58] Field of Search ................. 203/71, 73, 75, 77, 203/78, 80, 74, 42, 90, DIG. 9; 423/352; 55/44, 50, 70, 53

[56] References Cited

U.S. PATENT DOCUMENTS

| | | | |
|---|---|---|---|
| 1,911,922 | 5/1933 | Nottebohm | 55/70 |
| 3,186,795 | 6/1965 | Fields et al. | 423/352 |
| 3,340,182 | 9/1967 | Berkman et al. | 423/352 |
| 3,365,374 | 1/1968 | Short et al. | 423/352 |
| 3,404,072 | 10/1968 | Bollen et al. | 423/352 |
| 3,600,283 | 8/1971 | Bollen et al. | 423/352 |
| 3,972,693 | 8/1976 | Wiesner et al. | 55/70 |
| 4,002,565 | 1/1977 | Farrell et al. | 423/352 |
| 4,054,431 | 10/1977 | Kotcharian | 55/70 |
| 4,060,591 | 11/1977 | Garber et al. | 423/237 |
| 4,150,958 | 4/1979 | Jablin | 55/70 |
| 4,318,782 | 3/1982 | Pagani et al. | 423/352 |

FOREIGN PATENT DOCUMENTS

| | | | |
|---|---|---|---|
| 0057434 | 1/1975 | Australia | 55/70 |
| 0088478 | 9/1983 | European Pat. Off. | 423/352 |
| 0131254 | 6/1978 | Fed. Rep. of Germany | 55/70 |
| 0244775 | 10/1926 | United Kingdom | 423/352 |
| 0759286 | 10/1956 | United Kingdom | 423/352 |
| 0768830 | 2/1957 | United Kingdom | 423/352 |

Primary Examiner—S. Leon Bashore
Assistant Examiner—V. Manoharan
Attorney, Agent, or Firm—Karl F. Ross; Herbert Dubno

[57] ABSTRACT

An aqueous effluent is supplied to a stripping column (total stripping column) from which a mixture that is rich in $NH_3$, $CO_2$ and $H_2S$ is withdrawn as a head product. In at least one additional stripping column the mixture is separated into a mixture which is rich in $NH_3$ and a mixture which is rich in the sour gaes $CO_2$ and $H_2S$. The mixture which is rich in $NH_3$ is scrubbed with liquid ammonia. The overhead product from the total stripping column is cooled in a condenser under a pressure of 1 to 7 bars and is thus transformed into a liquid phase to such an extent that the liquid phase contains 70 to 100% of the $NH_3$ which has been supplied to the condenser. The liquid phase is supplied at a temperature of 30° to 90° C. to a second stripping column ($NH_3$ stripping column), which is operated under a pressure of 1 to 4 bars and from which a gas mixture that is rich in $NH_3$ is withdrawn as a head product. The gas mixture is scrubbed with water and ammonia and the $NH_3$ gas which has been scrubbed is condensed.

9 Claims, 1 Drawing Sheet

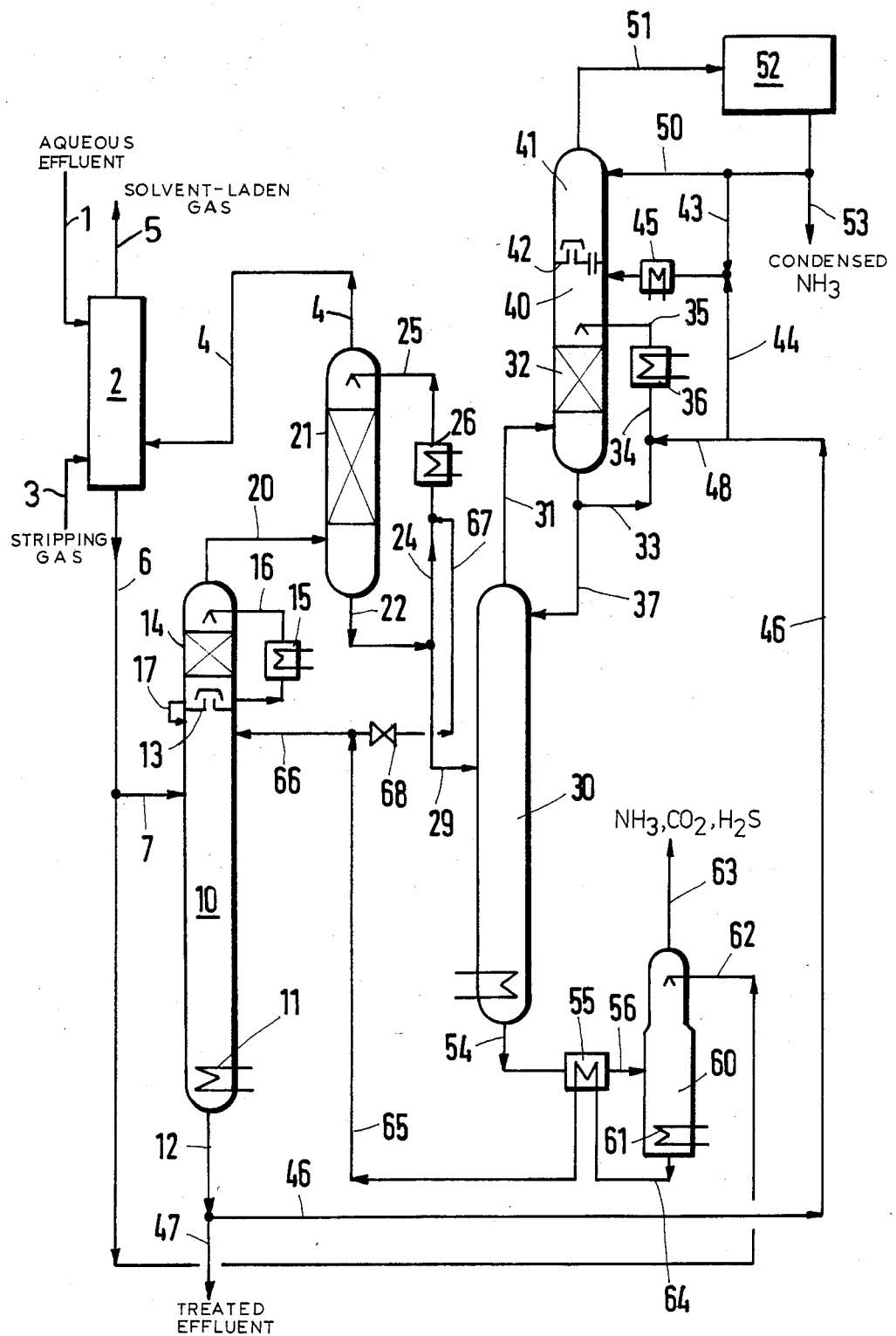

METHOD OF RECOVERING AMMONIA FROM AN AQUEOUS EFFLUENT WHICH CONTAINS $NH_3$, $CO_2$ AND $H_2S$

FIELD OF THE INVENTION

Our present invention relates to a process of recovering ammonia from an aqueous effluent which contains $NH_3$, $CO_2$, $H_2S$ and possibly other substances.

BACKGROUND OF THE INVENTION

An aqueous effluent containing $CO_2$, $H_2S$ and $NH_3$ can be supplied to a stripping column (total stripping column), from which a mixture that is rich in $NH_3$, $CO_2$ and $H_2S$ is withdrawn as a head product. This mixture is separated in at least one additional stripping column into a mixture that is rich in $NH_3$ and a mixture that is rich in the sour gases $CO_2$ and $H_2S$, and the mixture which is rich in $NH_3$ is scrubbed with liquid ammonia.

Such a process is known from German patent No. 2,527,985 and the corresponding U.S. Pat. No. 4,060,591.

OBJECT OF THE INVENTION

It is an object of the invention to improve the economy of the known process and particularly to effect a simple and effective separation of inert gases and of water-insoluble gases.

SUMMARY OF THE INVENTION

This object is accomplished in accordance with the invention in that the overhead product from the total stripping column is cooled in a condenser under a pressure 1 to 7 bars and is thus transformed to a liquid phase to such an extent that the liquid phase contains 70 to 100% of the $NH_3$ supplied to the condenser, the liquid phase is supplied at a temperature of 30° to 90° C. to a second stripping column ($NH_3$ stripping column) operated under a pressure of 1 to 4 bars, a head product consisting of a gas mixture that is rich in $NH_3$ is withdrawn from the second stripping column and is scrubbed with water and ammonia under a pressure of 1 to 4 bars, and the scrubbed $NH_3$ gas is condensed.

In that process the condenser has an important function because $NH_3$, $CO_2$ and $H_2S$ are almost completely transformed into a liquid phase in the condenser and are thus separated from the gases which would be disturbing in the further processing, particularly $N_2$, $H_2$, CO and $CH_4$, which may be regarded as inert gases in the present process. The inert gases are withdrawn and may be used as a stripping gas in a column for pretreating the aqueous effluent in order to remove, e.g. residual solvent used in a preceding extraction of phenols from the aqueous effluent.

The aqueous effluent to be treated in accordance with the invention consists in most cases of a condensate that has been formed, e.g. by a degasification, hydrogenation, gasification or liquefaction of coal or high-boiling petroleum fractions, such as residual oils. Dust, tar, oil, fatty acids and phenols are removed from the condensate, if necessary, before the condensate is treated for a separate recovery of ammonia and of $CO_2$ and $H_2S$.

The bottom products of the $NH_3$ stripping column are desirably treated in a third stripping column (deacidifying column) under a pressure in the range from 1.5 to 24 bars, which is higher by 0.5 to 20 bars and preferably by 2 to 12 bars than the pressure in the $NH_3$ stripping column. The stripped-off mixture consisting of the sour gases $CO_2$ and $H_2S$ is scrubbed with water and withdrawn. Bottom products are separately withdrawn and may be recycled to the total stripping column.

A partial stream of the bottom products of the deacidifying column may be added to the liquid phase delivered by the condenser particularly in order to adjust the concentrations of the substances in said liquid phase to optimum values.

The invention thus provides a method of recovering ammonia from an aqueous effluent which contains $NH_3$, $CO_2$ and $H_2S$, which comprises the steps of:

(a) passing the effluent through a total stripping column;

(b) recovering from the total stripping column as a head product a mixture rich in $NH_3$, $CO_2$ and $H_2S$;

(c) cooling the mixture rich in $NH_3$, $CO_2$ and $H_2S$ as recovered as the head product from the total stripping column in a condenser under a pressure of 1 to 7 bars to form a liquid phase therefrom which contains 70 to 100% of the $NH_3$ supplied to the condenser in the mixture;

(d) supplying the liquid phase at a temperature of 30° to 90° C. to a second stripping column and stripping it therein at a pressure of 1 to 4 bars;

(e) recovering from the second stripping column as a head product a gas mixture rich in $NH_3$;

(f) scrubbing the gas mixture rich in $NH_3$ from the second stripping column as a head product with water and ammonia under a pressure of 1 to 4 bars to form a scrubbed $NH_3$ gas; and (g) condensing the scrubbed $NH_3$ gas.

Advantageously the method further comprises the steps of:

withdrawing a bottom product from the second column;

deacidifying the bottom product by stripping it in a third stripping column at a pressure of 1.5 to 24 bars and which is greater by 0.5 to 20 bars than the pressure in the second stripping column, thereby producing a stripped-off mixture consisting essentially of $CO_2$ and $H_2S$;

scrubbing the stripped-off mixture consisting essentially of $CO_2$ and $H_2S$ with water; and recovering separately from the stripped-off mixture a bottom product of the third stripping column.

The third stripping column can be operated at a pressure which is greater by 2 to 12 bars than the pressure in the second stripping column.

The effluent can be extracted with a solvent to remove phenols therefrom before it is supplied to the total stripping column, the method further comprising the steps of:

recovering gases from the condenser; and stripping the solvent with the gases recovered from the condenser.

We can supply at least part of the bottom product recovered from the third column to the total stripping column.

Advantageously we supply a partial stream of the bottom product recovered from the third column to the liquid phase formed in the condenser.

The bottom product of the second column can be scrubbed with an aqueous effluent from which residual solvent used in an extraction of phenols has been removed.

The method also can comprise:

cooling at least part of the head product of the second stripping column until a condensate is formed;

sprinkling part of the condensate into the head product of the second stripping column; and feeding another part of the condensate into an upper portion of the second stripping column.

Preferably, the head product of the second stripping column is cooled and is scrubbed in at least two stages, in one of the stages the cooled head product of the second stripping column being scrubbed with a mixture of condensed ammonia and water, in another the stages the cooled head product of the second stripping column being scrubbed with condensed ammonia.

It is also advantageous for a partial stream of the aqueous effluent for the total stripping column to be directly contacted with the head product of the second stripping column.

BRIEF DESCRIPTION OF THE DRAWING

The above and other objects, features and advantages of the present invention will become more readily apparent from the following description, reference being made to the sole FIGURE of the accompanying drawing which is a flow diagram of a plant for carrying out the method.

SPECIFIC DESCRIPTION

The aqueous effluent to be treated usually consists of a condensate obtained by a degasification or gasification of coal. The aqueous effluent is supplied in line 1, after dust, tar, oil and phenols have been removed from the aqueous effluent. It is assumed that the aqueous effluent still contains residual solvent used to extract the phenols. The aqueous effluent is treated in a column 2 with stripping gas supplied via line 3. Additional stripping gas is supplied via line 4. The stripping gases leaving the column 2 in line 5 entrain the solvent, such as diisopropylether, and are supplied to processing means not shown.

The water leaving the column 2 in line 6 mainly contains $NH_3$, $CO_2$ and $H_2S$ and other gases in a low concentration. A major part of the aqueous effluent is supplied via line 7 to a total stripping column 10, in which all strippable gases are removed from the aqueous effluent. The plates of the column 10 are not shown for the sake of simplicity.

The column 10 contains in its sump a reboiler 11, which is known per se and ensures that the gases will rise as required. Treated aqueous effluent is withdrawn in line 12. The gases stripped off in column 10 rise through the gas-permeable plate 13 and then enter a partial condenser 14, in which they are sprinkled with circulating cooled condensate so that water vapor, above all, will be condensed. By a pump, not shown, the condensate is caused to flow through an external cooler 15 and is then returned in line 16 to the partial condenser 14. Surplus condensate is conducted via the overflow 17 to the total stripping column 10.

The overhead product of the total stripping column 10 is withdrawn in line 20 from the partial condenser 14 and as it enters another condenser 21 has an $NH_3$ content of 30 to 70 vol. %, preferably 50 to 60 vol. %, related to humid gas.

In the condenser 21, an intense cooling is effected so that a liquid phase at a temperature of 30° to 90° C. is formed. The liquid flowing through the condenser 21 is circulated through lines 22, 24 and 25 and is kept at a low temperature by means of an external cooler 26.

The liquid phase delivered by the condenser 21 includes at least 70% and preferably at least 90% of the $NH_3$ that is supplied in line 20 and absorbs a major part of the $CO_2$ and $H_2S$ which are supplied.

Inert gases, such as $N_2$, $H_2$, $CO$ and $CH_4$, are not dissolved in the liquid phase but are separated from the gas mixture and withdrawn in line 4.

Such inert gases are used as additional stripping gases in column 2. The condenser 21 is operated under a pressure in the range from 2 to 7 bars, preferably in the range from 2 to 4 bars. The cooler 26 is air-cooled or water-cooled.

A partial stream of the liquid phase in line 22 is withdrawn via line 29 and at a temperature of about 30 to 90° C. is supplied to an $NH_3$ stripping column, which is of a type known per se and the plates of which are not shown for the sake of simplicity.

The column 30 may have, for instance, 10 to 30 plates and the liquid phase is delivered by line 29 to a plate in the middle portion of the column 30. The $NH_3$ stripping column 30 is operated under a pressure of 1 to 4 bars. The overhead product from column 30 consists of a gas that is rich in $NH_3$ and contains residual sour gases ($CO_2$, $H_2S$ and via line 31 is supplied to a partial condenser 32, which is supplied with condensate that is circulated through lines 33, 34, 35 and an external cooler 36.

A partial stream of the condensate is recycled in line 37 to the top of the column 30. A first scrubbing stage 40 and a second scrubbing stage 41 are disposed over the partial condenser 32 and are separated by a plate 24, which is permeable to a rising flow of gas and to a downward flow of liquid.

The absorbent used in the first scrubbing stage 40 consists of a mixture of condensed ammonia from line 43 and aqueous effluent from line 44. That mixture is passed also through a cooler 45.

The aqueous effluent is a partial stream of aqueous effluent withdrawn from line 12 and is supplied in line 46. A major part of the aqueous effluent is conducted away in line 47. Part of the aqueous effluent in line 46 is conducted via line 48 to the liquid which is circulated through the partial condenser 32. The pressure in the scrubbing stages 40 and 41 and in the partial condenser 32 is approximately the same as in column 30.

The absorbent used in the second scrubbing stage 41 consists of condensed ammonia from line 50. Virtually pure $NH_3$ is supplied in line 51 to the ammonia condenser 52. Condensed ammonia is availble in line 53 as a product. If the aqueous effluent in line 6 contains organic constituents, particularly alcohols, ketones, nitriles and pyridine bases, such substances will be enriched in the scrubbing stage 41 and may be withdrawn from the latter as a partial liquid stream in a line that is not shown.

The water which accumulates in the sump of the $NH_3$ stripping column contains mainly ammonium salts. The temperatures in the sump of the column 30 are in the range from 60° to 110° C.

By means of a pump, not shown, the water is caused to flow in line 54 to a heat exchanger 55 and then flows at a temperature in the range from 90° to 150° C. through line 56 to the de-acidifying column 60, which is operated under a pressure that is higher by 0.5 to 20 bars and preferably by 2 to 12 bars than the pressure in column 30.

The de-acidification is improved by the higher pressure in column 60. With the aid of the reboiler 61, a gas mixture that is rich in $NH_3$, $CO_2$ and $H_2S$ is stripped off in the column 60 and that gas mixture is scrubbed with aqueous effluent from line 62 and is subsequently conducted in line 63 to means for a further processing.

The gas in line 63 may be supplied, e.g. as stripping gas to line 3 or directly to means for producing sulfur. The bottom products of column 60 consists of de-acidified water, which contains NH3 and small amounts of $CO_2$ and $H_2S$. The bottom products are withdrawn at temperatures of 120° to 170° C. in line 64 and deliver part of their heat content in the heat exchanger 55 and then flow in lines 65 and 66 at least in part to the total stripping column 10.

The partial stream, which is adjustable by the valve 68, is withdrawn in line 67 and admixed to the liquid phase, which is withdrawn in line 24 from the condenser 21. As a result, the load on the column 10 and the condenser 21 is reduced and the water content of the liquid in line 29 is adjusted.

SPECIFIC EXAMPLE

In a plant which corresponds to that shown in the drawing while the column 2 has been omitted, an aqueous effluent obtained by a gasification of coal is supplied via line 6 at a rate of 310 m$^3$/h. Tar, dust, oil and phenols have previously been removed from the aqueous effluent. In the following table the contents of $NH_3$, $CO_2$, $H_2S$, $H_2O$ and inert gases, in kilomoles per liter, as well as the pressure and temperatures, are stated for various lines used in the process that is shown in the drawing and has been explained hereinbefore. The inert gases consist of a mixture of CO, $H_2$, $CH_4$ and $N_2$. The temperatures and pressures in the top and sump portions of the various units (columns, condensers etc) are apparent from the data stated for the associated lines.

| LINE | $NH_2$ | $CO_2$ | $H_2S$ | $H_2O$ | INERT GASES | PRESSURE (bars) | TEMP. (°C.) |
|---|---|---|---|---|---|---|---|
| 6 | 156 | 148 | 8 | 17274 | 0.07 | 1.9 | 50 |
| 4 | 7 | 7 | 0.14 | 10 | 0.06 | 1.9 | 74 |
| 37 | 133 | 126 | 7 | 14683 | 0.06 | 1.9 | 50 |
| 12 | 0.6 | 0.3 | 0.01 | 17359 | 0.0 | 2.4 | 126 |
| 29 | 785 | 190 | 12 | 2706 | — | 2.0 | 80 |
| 31 | 286 | 0.1 | 3 | 30 | — | 1.9 | 64 |
| 37 | 138 | 0.1 | 3 | 307 | — | 1.9 | 43 |
| 46 | — | — | — | 277 | — | 1.9 | 35 |
| 47 | 0.6 | 0.1 | 0.01 | 17270 | — | 2.4 | 40 |
| 51 | 358 | — | — | — | — | 1.6 | −24 |
| 53 | 148 | — | — | — | — | 1.6 | −24 |
| 54 | 637 | 190 | 12 | 2983 | — | 2.0 | 88 |
| 62 | 23 | 22 | 1 | 2591 | 0.01 | 1.9 | 35 |
| 63 | — | 141 | 8 | 1 | 0.01 | 10.2 | 41 |
| 64 | 660 | 71 | 5 | 5573 | — | 10.5 | 148 |

We claim:

1. A method of recovering ammonia from an aqueous effluent which contains $NH_3$, $CO_2$ and $H_2S$, which comprises the steps of:
   (a) passing said effluent through a total stripping column;
   (b) recovering from said total stripping column as a head product a mixture rich in $NH_3$, $CO_2$ and $H_3S$;
   (c) cooling said mixture rich in $NH_3$, $CO_2$ and $H_2S$ as recovered as said head product from said total stripping column in a condenser under a pressure of 1 to 7 bars to form a liquid phase therefrom which containe 90 to 100% of the $NH_3$ supplied to said condenser in said mixture, recovering inert gases formed from said condenser;
   (d) supplying said liquid phase at temperature of 30° to 90° C. to the middle portion of a second stripping column and stripping it therein at a pressure of 1 to 4 bars;
   (e) recovering from said second stripping column as a head product a gas mixture rich in $NH_3$;
   (f) scrubbing and cooling the gas mixture rich in $NH_3$ recovered from said second stripping column as a head product with water and ammonia under a pressure of 1 to 4 bars to form a scrubbed $NH_3$ gas; and
   (g) condensing the scrubbed $NH_3$ gas.

2. The method defined in claim 1, further comprising the steps of:
   withdrawing a bottom product from said second column;
   deacidifying said bottom product by stripping it in a third stripping column at a pressure of 1.5 to 24 bars and which is greater by 0.5 to 20 bars than the pressure in said second stripping column, thereby producing a stripped-off mixture consisting essentially of $CO_2$ and $H_2S$;
   scrubbing said stripped-off mixture consisting essentially of $CO_2$ and $H_2S$ with water; and
   recovering separately from said stripped-off mixture a bottom product of said third stripping column.

3. The method defined in claim 2 wherein said third stripping column is operated at a pressure which is greater by 2 to 12 bars than the pressure in said second stripping column.

4. The method defined in claim 1 wherein said effluent is extracted with a solvent to remove phenols therefrom before it is supplied to said total stripping column, said method further comprising the step of
   stripping said solvent with the gases recovered from said condenser.

5. The method defined in claim 1, further comprising the step of supplying at least part of the bottom product recovered from said third column to said total stripping column.

6. The method defined in claim 5, further comprising the step of supplying a partial stream of the bottom product recovered from said third column to the liquid phase formed in said condenser.

7. The method defined in claim 1, further comprising the steps of:
   cooling said head product of said second stripping column until a condensate is formed;
   sprinkling part of said condensate into said head product of said second stripping column; and
   feeding another part of said condensate into an upper portion of said second stripping column.

8. The method defined in claim 1 wherein said head product of said second stripping column is cooled and is scrubbed in at least two stages, in one of said stages the cooled head product of said second stripping column being scrubbed with as mixture of condensed ammonia and water, in another said stages the cooled head product of said second stripping column being scrubbed with condensed ammonia.

9. The method defined in claim 1 wherein a partial stream of the aqueous effluent for the total stripping column is directly contacted with said head product of the second stripping column.

* * * * *